United States Patent
Gunji et al.

(10) Patent No.: US 10,988,105 B2
(45) Date of Patent: Apr. 27, 2021

(54) VEHICULAR PROTECTION SYSTEM

(71) Applicant: HONDA MOTOR CO., LTD., Tokyo (JP)

(72) Inventors: Yasuaki Gunji, Wako (JP); Masaki Umezawa, Wako (JP); Hiroyuki Asanuma, Wako (JP); Osamu Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 16/531,647

(22) Filed: Aug. 5, 2019

(65) Prior Publication Data

US 2020/0047709 A1    Feb. 13, 2020

(30) Foreign Application Priority Data

Aug. 8, 2018  (JP) .............................. JP2018-149338

(51) Int. Cl.
| | |
|---|---|
| *B60R 21/38* | (2011.01) |
| *B60R 21/0134* | (2006.01) |
| *B60R 21/36* | (2011.01) |
| *B60W 30/08* | (2012.01) |

(52) U.S. Cl.
CPC .......... *B60R 21/38* (2013.01); *B60R 21/0134* (2013.01); *B60R 21/36* (2013.01); *B60W 30/08* (2013.01)

(58) Field of Classification Search
CPC ..... B60R 21/0134; B60R 21/36; B60R 21/38; B60W 30/08
See application file for complete search history.

(56) References Cited

U.S. PATENT DOCUMENTS

| | | | | |
|---|---|---|---|---|
| 6,217,108 | B1* | 4/2001 | Sasaki | B60R 21/013 180/274 |
| 8,490,736 | B2* | 7/2013 | Hwang | B60R 21/38 180/274 |
| 2020/0023806 | A1* | 1/2020 | Sasaki | B60R 21/38 |
| 2020/0047708 | A1* | 2/2020 | Umezawa | B60R 21/38 |
| 2020/0062202 | A1* | 2/2020 | Umezawa | B60R 21/36 |

FOREIGN PATENT DOCUMENTS

| | | |
|---|---|---|
| JP | 2004-249872 A | 9/2004 |
| JP | 2014-015111 A | 1/2014 |

* cited by examiner

*Primary Examiner* — Laura Freedman
(74) *Attorney, Agent, or Firm* — Rankin, Hill & Clark LLP

(57) ABSTRACT

A vehicular protection system for protecting a protection target colliding with a vehicle is provided, which includes: a bulkhead having a bulkhead upper which extends in a vehicle widthwise direction and is arranged at an upper portion thereof; a hood arranged over the bulkhead upper; a bulkhead pop-up device configured to lift up the bulkhead upper and the hood; and a hood-moving device configured to be able to move forward the bulkhead upper and the hood. When the protection target colliding with the vehicle is protected, the bulkhead pop-up device is used to lift up the bulkhead upper and the hood and the hood-moving device is then used to move forward the bulkhead upper and the hood.

6 Claims, 10 Drawing Sheets

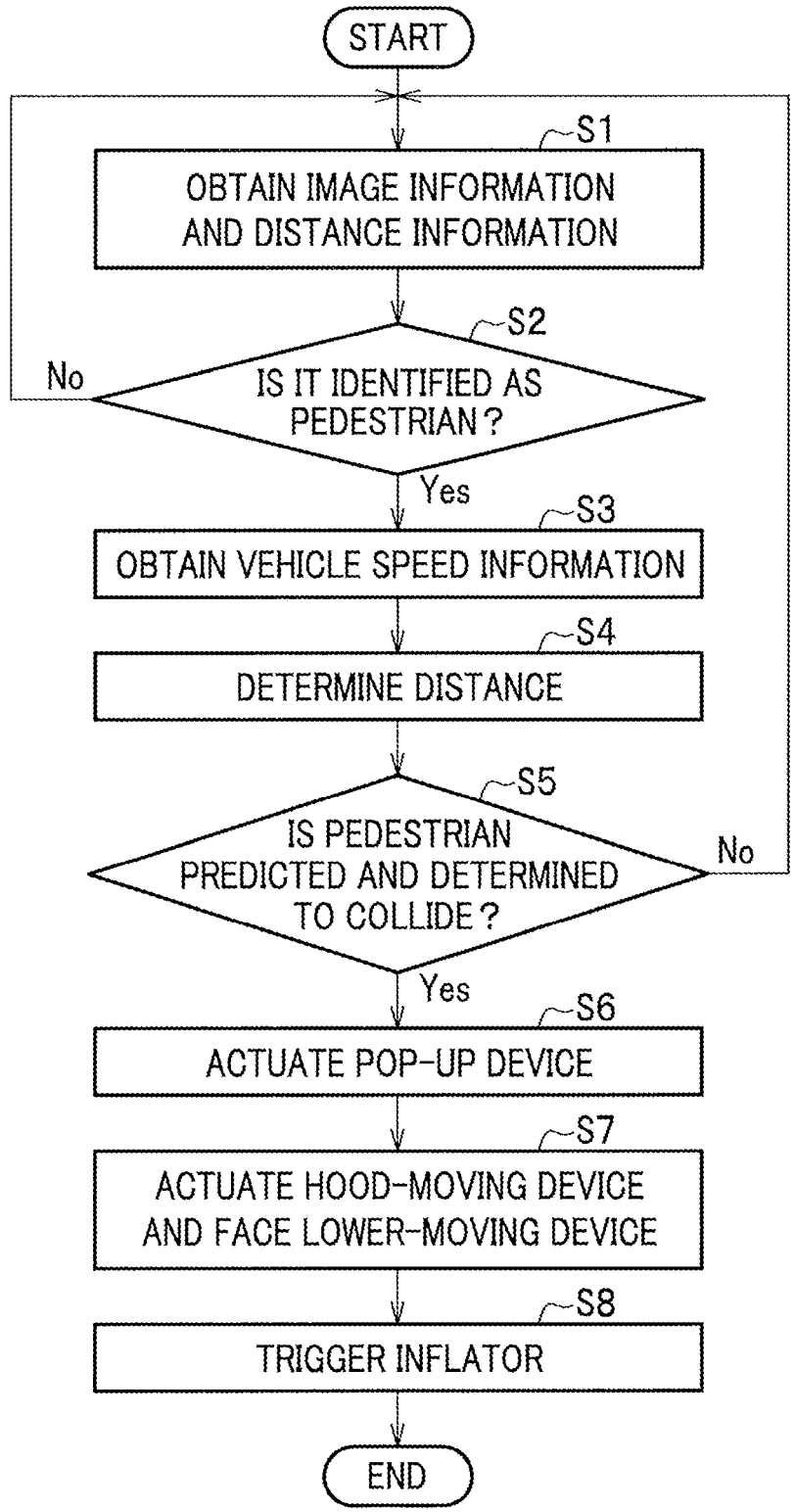

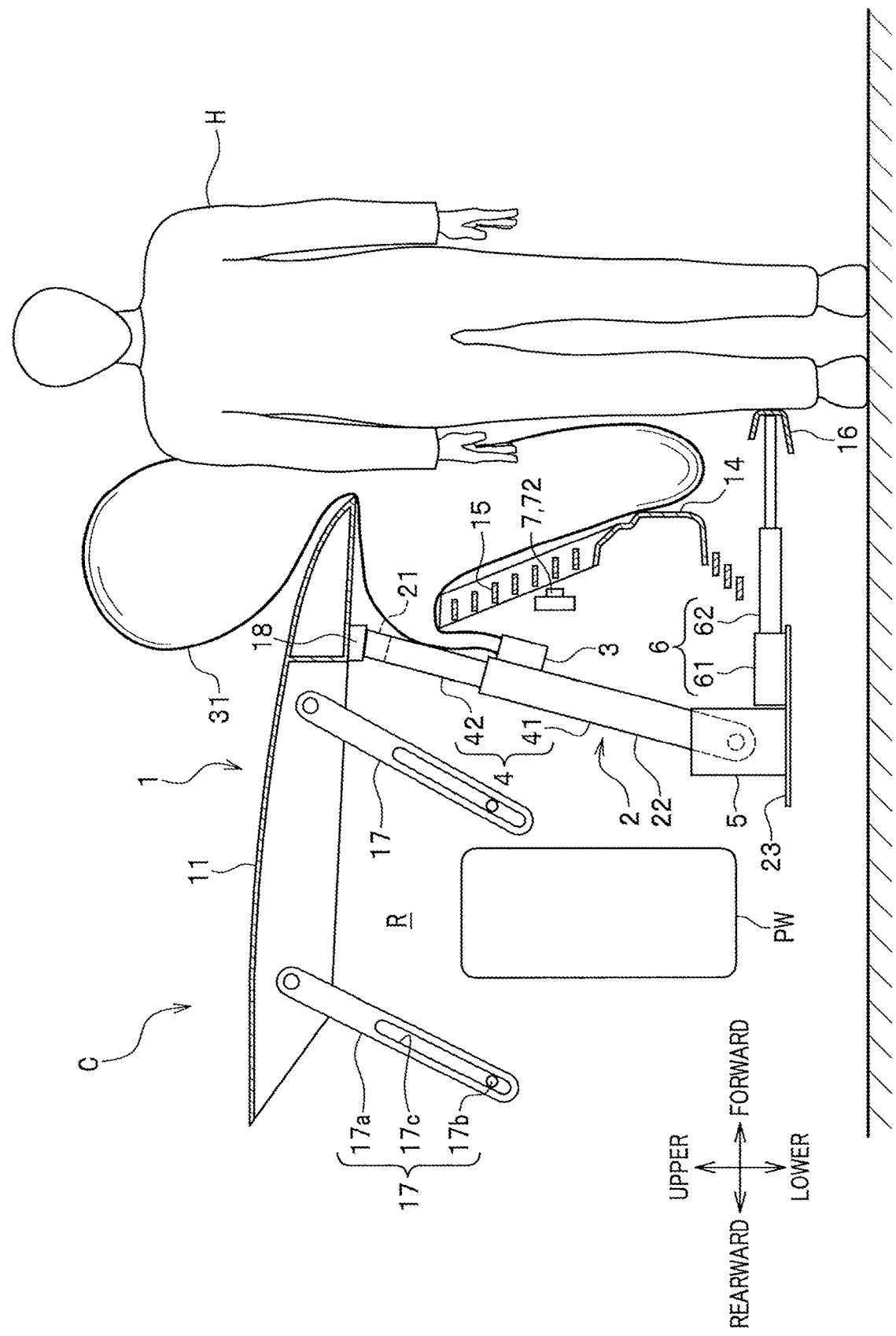

VEHICULAR PROTECTION SYSTEM

BACKGROUND OF THE INVENTION

1. Field of the Invention

The present invention relates to a vehicular protection system used to protect a protection target such as a pedestrian by reducing an impact when a vehicle collides with the protection target.

2. Description of the Related Art

For instance, lift-up hoods disclosed in JP2004-249872A and JP2014-15111A have conventionally been known as vehicular protection systems used to lift a hood and receive a protection target (pedestrian) when a vehicle collides with the protection target, thereby reducing an impact.

The lift-up hood disclosed in JP2004-249872A is attached to an upper portion of a bulkhead (radiator support) and is provided with an actuator for absorbing an impact imposed on a pedestrian.

Regarding the hood flip-up device disclosed in JP2014-15111A, a bulkhead is provided with an airbag apparatus configured to flip up a hood and an energy-absorbing mechanism configured to absorb an impact input to the hood, thereby reducing an impact on a protection target hit on the hood.

SUMMARY OF INVENTION

Regarding the vehicular protection systems disclosed in JP2004-249872A and JP2014-15111A, an actuator or airbag apparatus provided at a bulkhead below a front end of a hood is used to lift the hood up, thereby absorbing impact energy on a protection target colliding with a vehicle.

Unfortunately, the volume of the airbag, etc., needed to absorb the energy has to be enlarged in order to avoid the contact between the hood and a power unit (e.g., an engine) when the hood receives the protection target.

Here, the embodiments of the present invention provide a vehicular protection system such that when a protection target such as a pedestrian collides with a vehicle, an impact imposed on the protection target can be efficiently absorbed and the contact between a hood and a power unit can be avoided.

An aspect of the embodiments of the present invention provides a vehicular protection system for protecting a protection target colliding with a vehicle, comprising: a bulkhead having a bulkhead upper which extends in a vehicle widthwise direction and is arranged at an upper portion thereof; a hood arranged over the bulkhead upper; a bulkhead pop-up device configured to lift up the bulkhead upper and the hood; and a hood-moving device configured to be able to move forward the bulkhead upper and the hood. When the protection target colliding with the vehicle is protected, the bulkhead pop-up device is used to lift up the bulkhead upper and the hood and the hood-moving device is then used to move forward the bulkhead upper and the hood.

The present invention can provide a vehicular protection system such that when a protection target such as a pedestrian collides with a vehicle, an impact imposed on the protection target can be efficiently absorbed and the contact between a hood and a power unit can be avoided.

BRIEF DESCRIPTION OF DRAWINGS

FIG. 4 is a flowchart showing how the vehicular protection system works.

FIG. 5F is a diagram illustrating a state when the protection target collides with the vehicle and the airbag is deployed to restrict the protection target from falling thereon.

DETAILED DESCRIPTION OF EMBODIMENTS

With reference to FIGS. 1 to 5H, the following exemplifies a vehicular protection system 1 according to an embodiment of the present invention.

Note that as described herein, the traveling direction of a vehicle C is referred to as "forward"; the retreating direction is referred to as "rearward"; the vertically upward side is referred to as "upper"; the vertically downward side is referred to as "lower"; the vehicle width direction is referred to as "left" or "right".

First, before description of the vehicular protection system 1, described is a vehicle C to which the vehicular protection system 1 is applicable.

<<Vehicle>>

Figure 1:
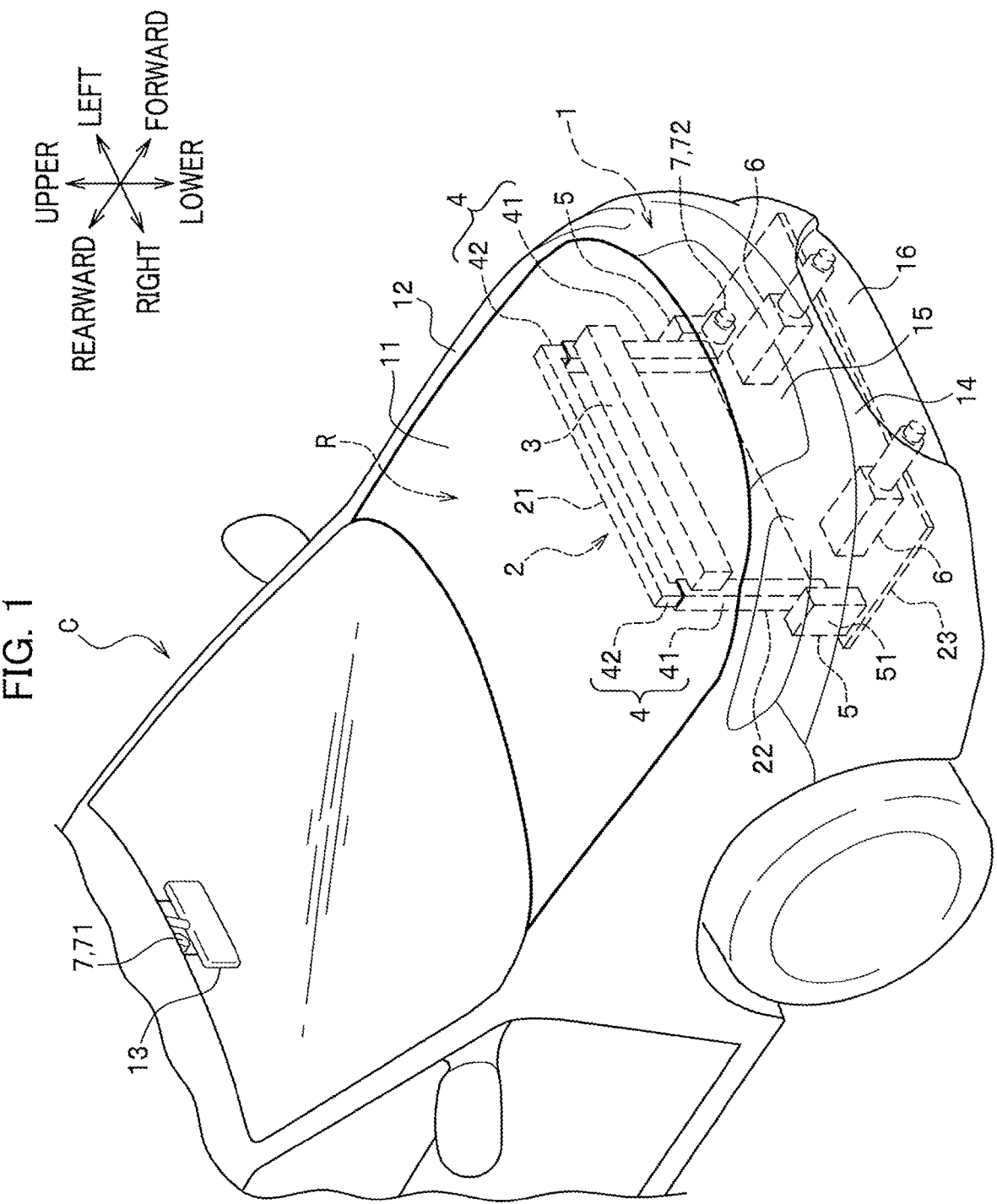
FIG. 1 is a perspective view schematically illustrating essential parts of a vehicular protection system according to an embodiment of the present invention and shows a normal vehicle state.

As shown in FIG. 1, the vehicle C, including the vehicular protection system 1 according to the present invention, may be a hood-type automobile having a hood 11 on the vehicle body front side, or may be a car or a work vehicle. The car model is not particularly limited. Hereinafter, the vehicle C will be described, and examples include a car having a motor room at a vehicle body front section.

The vehicle C includes the hood 11, fenders 12, a rearview mirror 13, a bumper face 14, a hood grill 15, a face lower 16, linking members 17 (see FIG. 2), a bulkhead 2, and the vehicular protection system 1.

Figure 2:
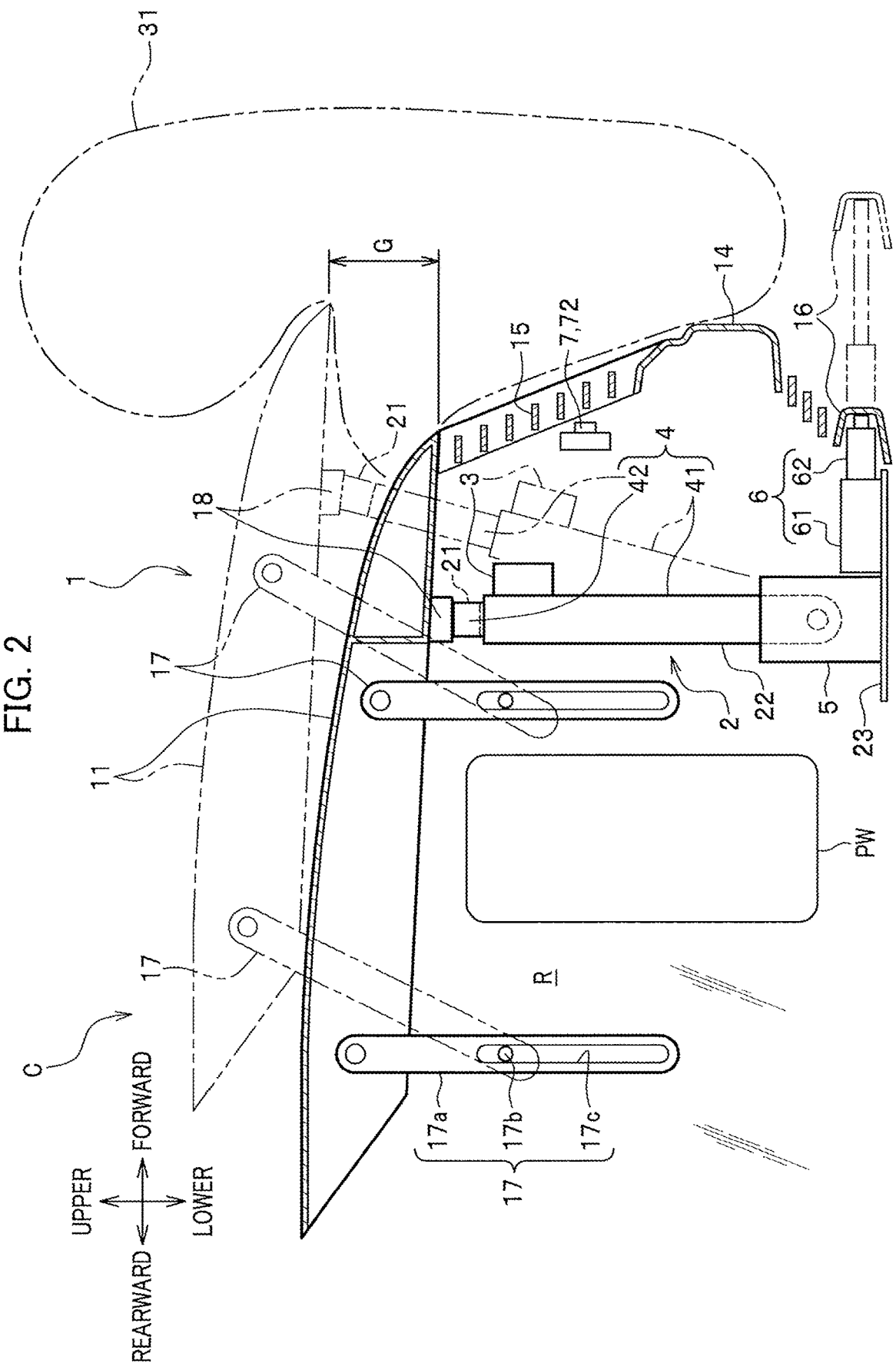
FIG. 2 is a diagram illustrating how the vehicular protection system looks like when a protection target collides with the vehicle.

The hood 11 is an engine hood panel by which an impact is absorbed while a protection target is elastically received thereon when the protection target collides with the vehicle C. The hood 11 is provided with, for instance, a hood skin placed on the upper side of a motor room R and a hood frame fixed to the hood skin on the motor room R side. It is preferable that the hood skin is made of a flexible and elastic plate member, which can be curved and deformed upon receipt of a given load or more, so as to be able to softly receive a pedestrian H (see FIG. 5E) when he/she hits the hood 11 at the time of collision. As shown in FIG. 2, a lower portion of the hood 11 is provided with: linking members 17 disposed at front and rear portions on the left or right side wall; and connecting members 18 disposed at lower surface front portions of the hood 11.

As shown in FIG. 1, the fenders 12 are fender panels provided upward of front wheels and on the left and right sides of the hood 11.

The rearview mirror 13 is a room mirror installed on an upper front end of a cabin.

The bumper face 14 is a resin member arranged forwardly of a bumper beam (not shown) and covering the front side of the bumper beam (not shown).

The hood grill 15 is a member through which the outside air travels from the vehicle front end and is guided to a radiator (not shown). The hood grill 15 includes a plurality of board-like air guide plates that extend in the vehicle width direction and are arranged in parallel with an appropriate interval. The bulkhead 2 is arranged behind the hood grill 15.

The face lower 16 is formed of a resin member that is arranged on the center lower side of the bumper face 14 and extends in the vehicle widthwise direction. Note that the face lower 16 may be made of a shock absorber such as soft resin so as to absorb an impact on the leg(s) of a pedestrian H when the pedestrian H has collided with the vehicle C.

As shown in FIG. 2, each linking member 17 is a support member that can support and move the hood 11 in the vertical direction and in the front-rear direction with respect to the vehicle body. Each linking member 17 includes: a linker 17a, an upper end portion of which is pivoted on the hood 11; and a support pin 17b that is slidably engaged with an elongated hole 17c of the linker 17a and is fixed to the vehicle body.

Each connecting member 18 is a member that rotatably connects the hood 11 and an upper portion of the bulkhead upper 21.

Note that the linking members 17 and the connecting members 18, which are connected to the hood 11, can be used to appropriately change how the hood 11 is connected thereto by unlocking a lock member (not shown), thereby making an open space of the motor room R wider or narrower by using the hood 11.

<Bulkhead>As shown in FIG. 1, the bulkhead 2 is provided with the bulkhead upper 21 on an upper portion thereof and is made of frame members arranged like an approximately rectangular frame when viewed from the front side. The bulkhead 2 is a member, what is called a front bulkhead, core support, or radiator support. The bulkhead 2 includes: the bulkhead upper 21 having plungers 42 of a bulkhead pop-up device 4; a pair of left and right bulkhead sides 22 each having a built-in driving unit 41 of the bulkhead pop-up device 4; and a bulkhead lower 23 carrying a driving unit main body 51 of a hood-moving device 5.

As shown in FIG. 2, the bulkhead upper 21 is a vehicle body frame extending in the vehicle widthwise direction. Lower surfaces of left and right ends of the bulkhead upper 21 are each joined to an upper end of one of the plungers 42 of the bulkhead pop-up device 4. Because of this configuration, the bulkhead upper 21 is arranged such that the bulkhead upper 21 is lifted upward with respect to the left and right bulkhead sides 22 when the bulkhead pop-up device 4 is actuated.

The left and right bulkhead sides 22 are each a vehicle body frame that serves as the driving unit 41 configured to be able to support and make the plunger 42 advance and retreat. That is, the left and right bulkhead sides 22 each house the driving unit 41 for making the plunger 42 advance and retreat. Lower end portions of the left and right bulkhead sides 22 can be rotated in the front-rear direction and are supported by the hood-moving device 5.

As shown in FIG. 1, the bulkhead lower 23 is a vehicle body frame that is arranged via a gap G (see FIG. 2) below the left and right bulkhead sides 22 and extends in the vehicle widthwise direction. Left and right ends of the bulkhead lower 23 are connected to front end lateral surfaces, etc., of a front side frame (not shown) by welding.

<<Vehicular Protection System>>

As shown in FIG. 2, the vehicular protection system 1 is a system for protecting a protection target colliding with the vehicle C. The vehicular protection system 1 has, when it is predicted that a protection target such as a pedestrian H (see FIG. 5E) collides with the vehicle C, a function of receiving the pedestrian H by using the hood 11 moved upward and forward and the airbag 31 deployed and a function of preventing the power unit PW from contacting the hood 11 which has received the pedestrian H.

Figure 3:
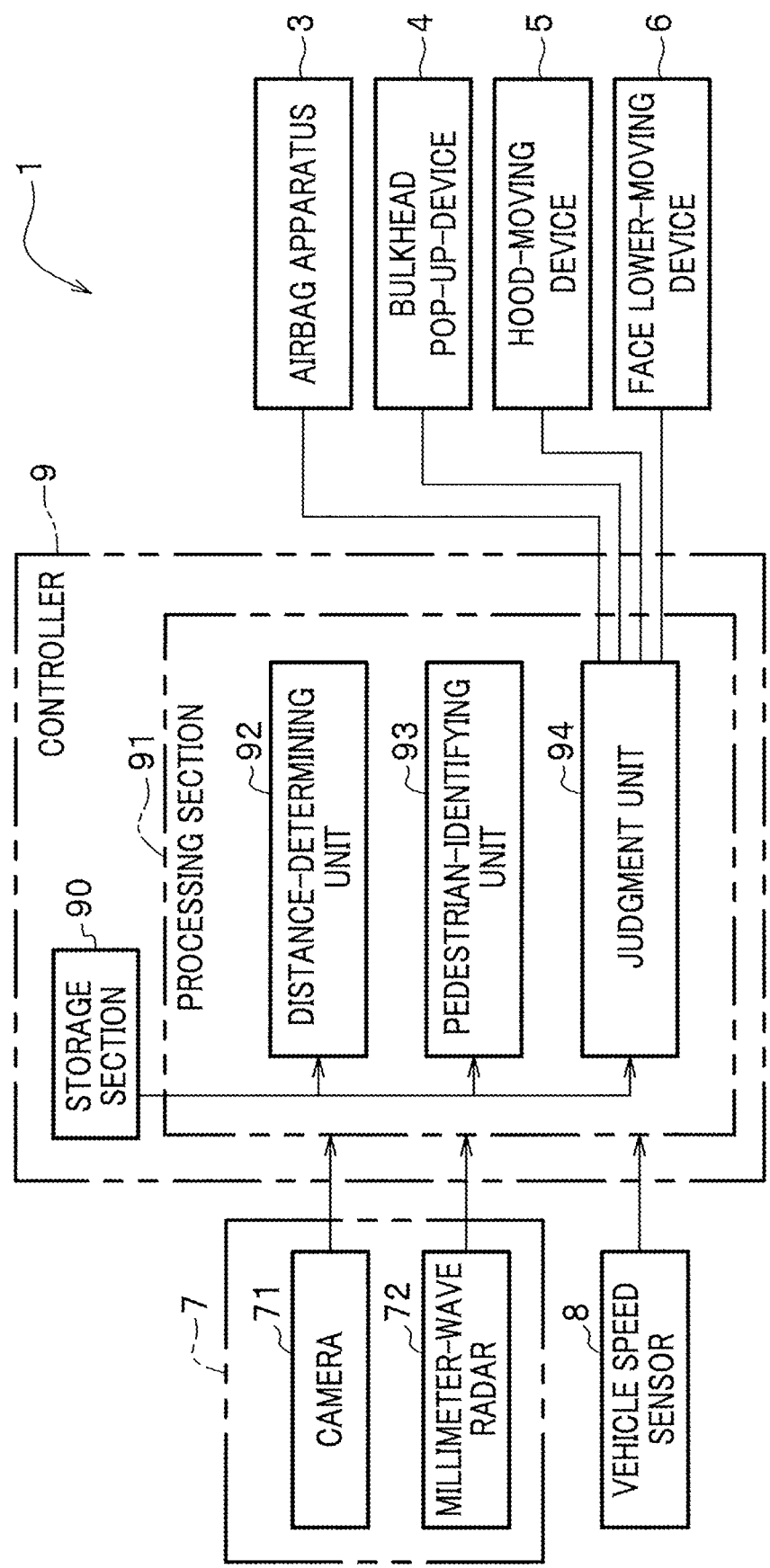
FIG. 3 is a block diagram illustrating an example of the vehicular protection system.

As shown in FIG. 3, the vehicular protection system 1 includes the airbag apparatus 3, the bulkhead pop-up device 4, the hood-moving device 5, the face lower-moving device 6, a collision-predicting device 7, a vehicle speed sensor 8, and a controller 9.

<Protection Target>

As shown in FIGS. 5E to 5H, the protection target that is protected when having collided with the vehicle C is, for instance, a pedestrian H, a human other than the pedestrian H, a bicycle rider, or a two-wheel vehicle rider. Hereinafter, the protection target is described by using the case of pedestrian H as an example.

<Vehicle Speed Sensor>The vehicle speed sensor 8 shown in FIG. 3 is a sensor that detects the speed of the vehicle C. The vehicle speed sensor 8 detects the vehicle speed by, for instance, measuring the rotation of a wheel. The vehicle speed sensor 8 is electrically connected to a judgment unit 94 of the controller 9.

<Collision-Predicting Device>

Figure 5A:
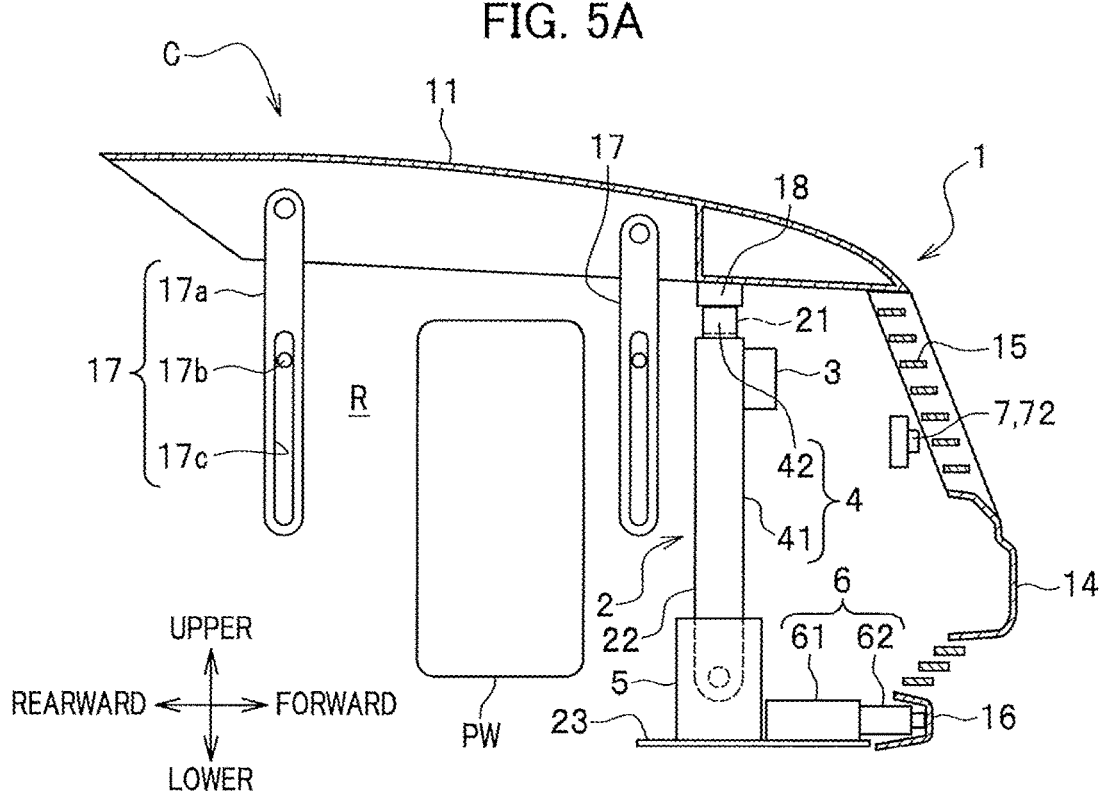
FIG. 5A is a diagram illustrating how the vehicular protection system looks like during normal time.
Figure 5B:
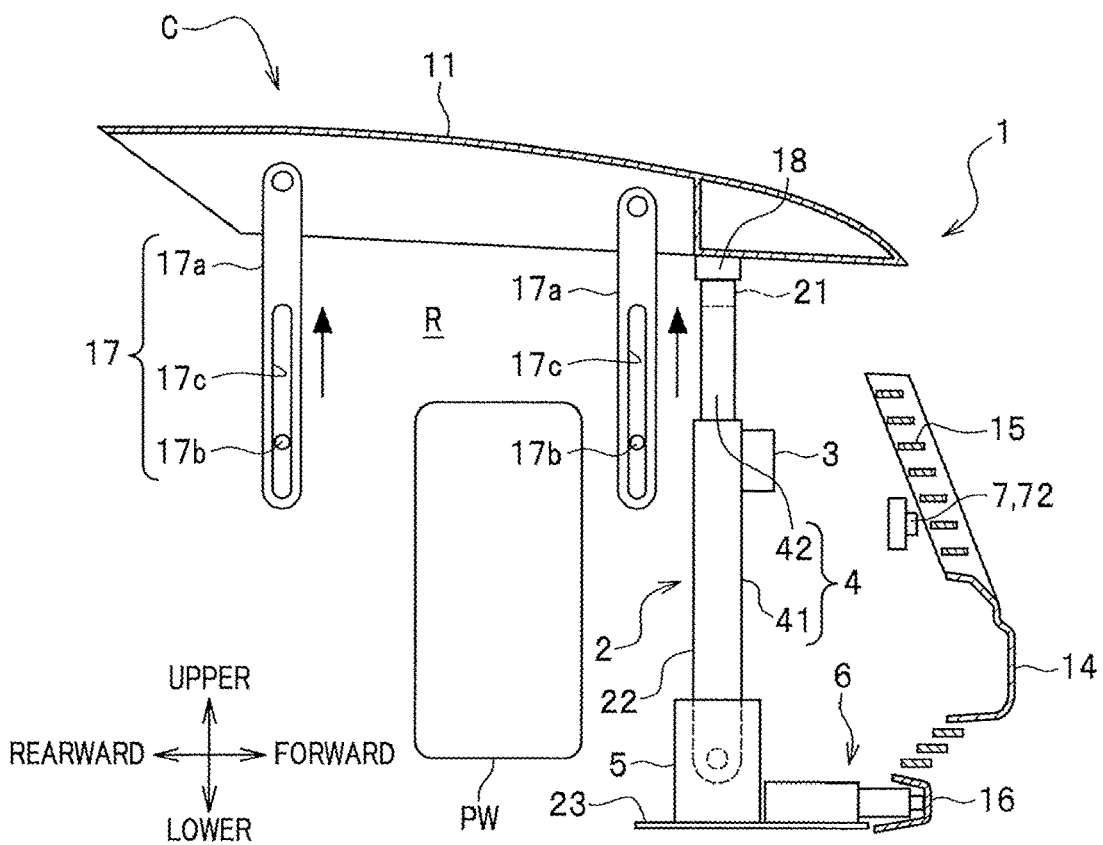
FIG. 5B is a diagram illustrating a state when a bulkhead pop-up device is used to lift up a bulkhead upper and a hood.
Figure 5C:
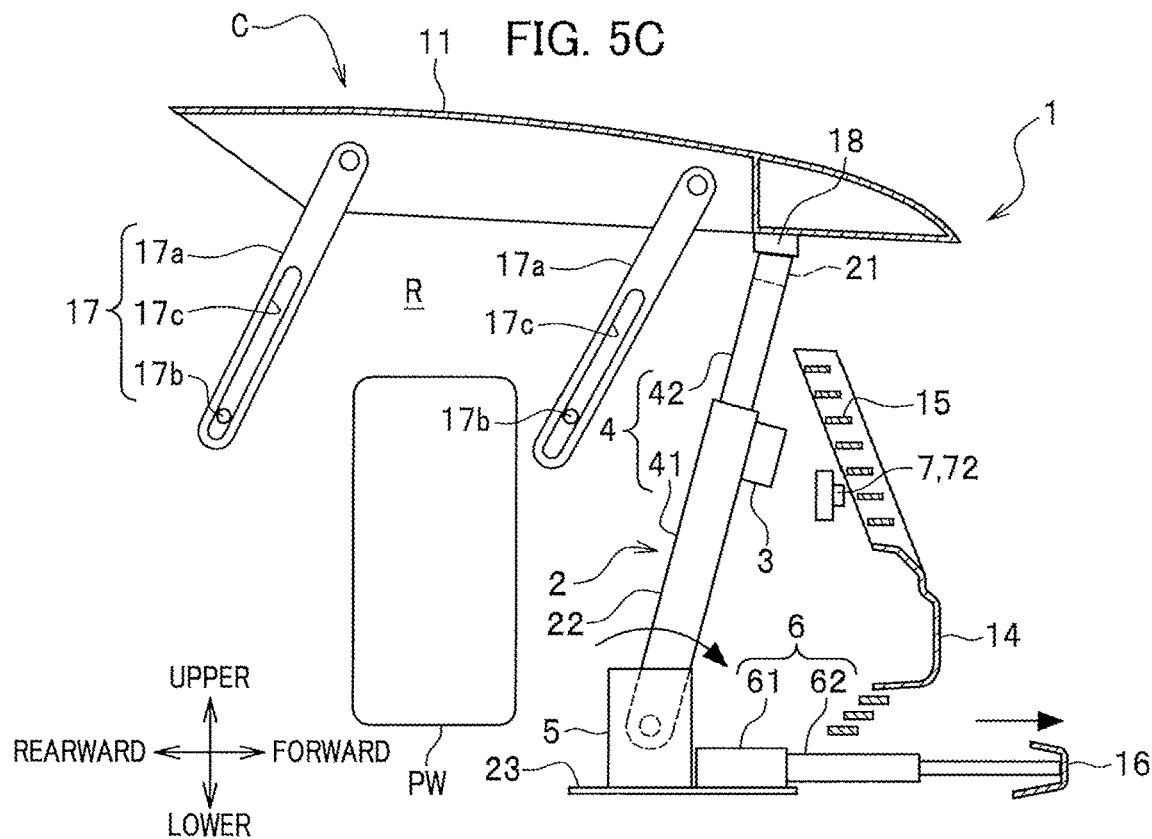
FIG. 5C is a diagram illustrating a state when a hood-moving device is used to move forward the bulkhead upper and the hood and a face lower-moving device is used to move forward a face lower.
Figure 5D:
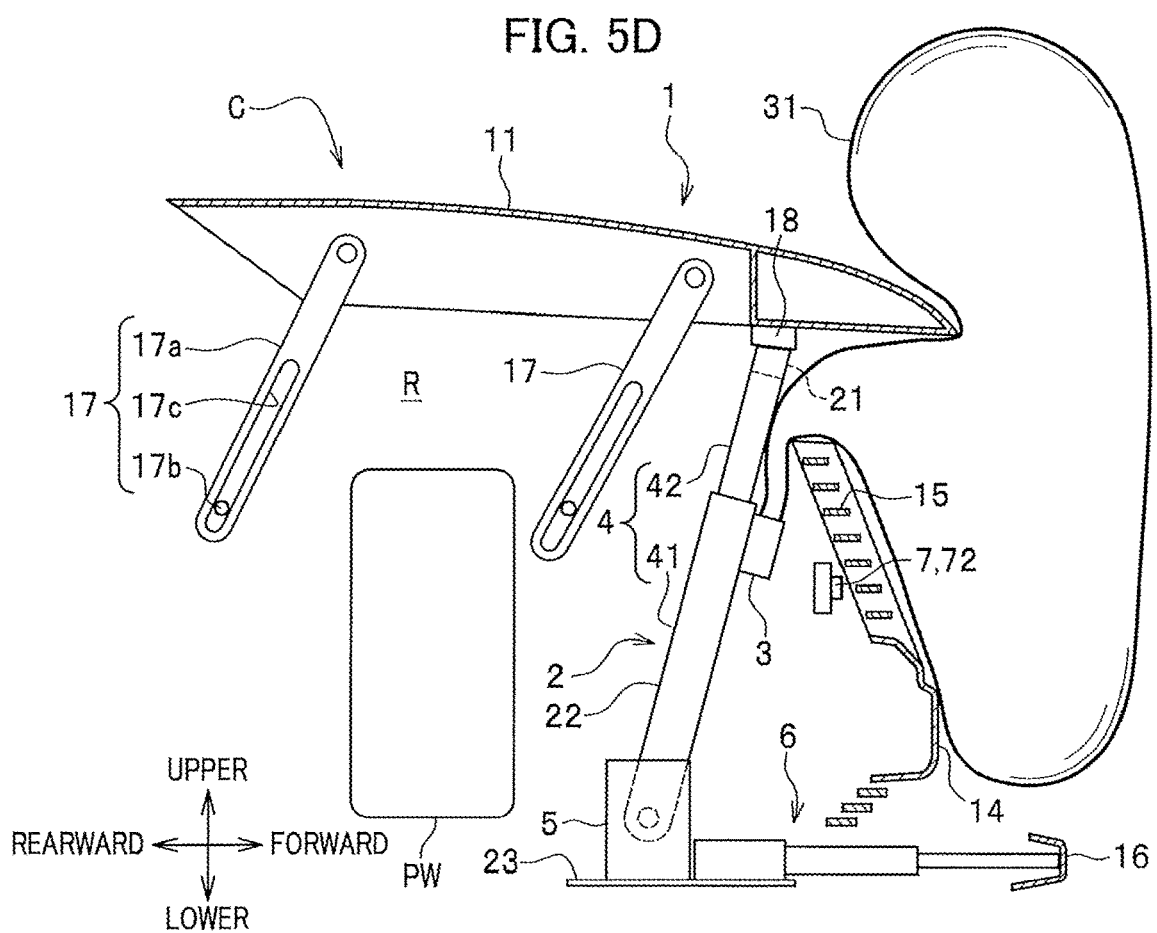
FIG. 5D is a diagram illustrating a state when an airbag is deployed by an airbag apparatus.
Figure 5E:
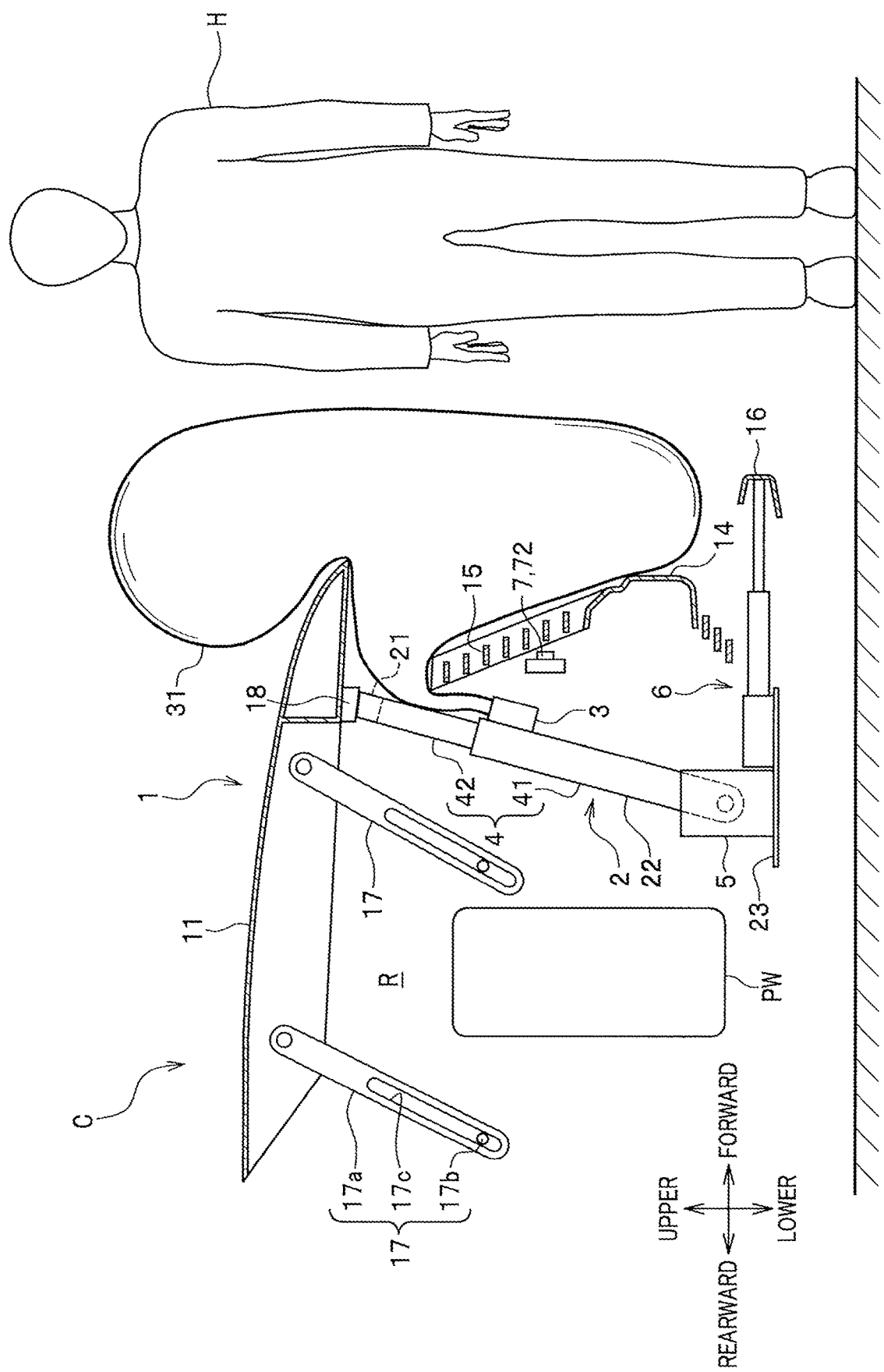
FIG. 5E is a diagram illustrating a state of the vehicular protection system prepared for a collision with a protection target by deploying the airbag and by moving upward and then forward the bulkhead upper and the hood.

As shown in FIG. 1, the collision-predicting device 7 is a device configured to detect a pedestrian H and acquire detection data about, for instance, the distance from a front section of the vehicle C to the pedestrian H, the speed of the pedestrian H, and a difference (relative speed) between the speed of the vehicle C and the speed of the pedestrian H (see FIG. 5E). The collision-predicting device 7 is provided with a camera 71, an obstacle-detecting radar unit such as a millimeter-wave radar 72, an obstacle-detecting sensor configured to emit and receive an ultrasonic wave or laser beam, or an advanced driver-assistance system (ADAS) having the camera 71 and the radar unit. The collision-predicting device 7 (camera 71 and millimeter-wave radar 72) is electrically connected to the controller 9.

Hereinafter, the collision-predicting device 7 is described by using, as an example, the case of having the camera 71 and the millimeter-wave radar 72.

<Camera>

As shown in FIG. 1, the camera 71 is a unit for acquiring image data used to detect a pedestrian H (see FIG. 5E). The camera 71 is an image-capturing means for acquiring vehicle front image data so as to determine whether or not a colliding collision object is a human such as a pedestrian H. Examples of the camera 71 include infrared cameras and CCD cameras that capture vehicle C front images. The camera 71 is attached to, for instance, the vicinity of the rearview mirror 13 or the front surface of the rearview mirror 13 so as to acquire data about images in front of a windshield. The camera 71 is electrically connected to the controller 9 and image data acquired by the camera 71 is sent to the controller 9.

Note that a plurality of cameras 71 may be provided at multiple sites such as the rearview mirror 13 as well as the hood grill 15 and a door mirror. Note that if the camera 71 is an infrared camera, the vehicle C front images can be displayed, for instance, even during nighttime when the surrounding is dark.

<Airbag Apparatus>

The airbag apparatus 3 is an apparatus configured to receive a trigger signal from the judgment unit 94 of the below-described controller 9 to deploy the airbag 31 forward from the lower side of the hood 11, thereby protecting a pedestrian H colliding with the vehicle C. Specifically, the airbag apparatus 3 deploys the airbag 31 forward from the front end lower side of the hood 11 when the bulkhead pop-up device 4 is used to lift up the bulkhead upper 21 and the hood 11 and the hood-moving device 5 is then used to move forward the bulkhead upper 21 and the hood 11. The airbag apparatus 3 is provided with the airbag 31 and an inflator (not shown) and, for instance, is bridged between upper front surfaces of the left and right bulkhead sides 22. The airbag apparatus 3 makes the airbag 31 deployed when the judgment unit 94 predicts, based on the image data from the collision-predicting device 7, a collision between the pedestrian H and the vehicle C.

As shown in FIGS. 5E to 5H, the airbag 31 is an airbag body deployed using the inflator (not shown) to absorb an impact at the time of collision between the pedestrian H and the vehicle C. The airbag 31 is arranged such that the airbag 31 is folded extending laterally on the front side of the left and right bulkhead sides 22. The airbag 31 has a deployment width so as to cover the front upper side of the hood 11 to the front side of the bumper face 14 and has a thickness so as to be able to softly receive the pedestrian H having collided with the vehicle C. The airbag 31 has vent holes (not shown) for releasing the air so as to suitably shrink after the deployment.

The inflator is a unit for deploying the airbag 31. The inflator is triggered by a trigger signal sent from the judgment unit 94 when the judgment unit 94 (see FIG. 3) predicts the collision. For instance, the inflator is provided with a gas generation unit including: an ignition apparatus (not shown) electrically connected to the judgment unit 94 (see FIG. 3); a gas generating agent composed of sodium azide, etc.; and a case body housing them. The inflator functions such that a trigger signal from the judgment unit 94 (FIG. 3) causes the ignition apparatus to instantly ignite the gas generating agent, thereby generating high-pressure nitrogen gas to immediately inflate the airbag 31. The inflator is formed extending in the vehicle width direction such that the inflator is fit for the shape of the airbag 31 in order to smoothly and widely inflate the airbag 31.

<Bulkhead Pop-Up Device>

As shown in FIG. 2, the bulkhead pop-up device 4 is a device configured to lift up the bulkhead upper 21 and the hood 11. The bulkhead pop-up device 4 is actuated by a trigger signal from the judgment unit 94 when the judgment unit 94 (see FIG. 3) predicts and determines that a pedestrian H collides with the vehicle C. Then, the bulkhead upper 21 together with the hood 11 is instantly lifted up, so that a stroke of the hood 11 can be increased. At that time, the bulkhead pop-up device 4 lifts a front end portion of the hood 11 up to the height of the waist of the pedestrian H. Accordingly, the pedestrian H is smoothly guided and inclined onto the hood 11. In this way, the shock absorption is enhanced.

In addition, when the bulkhead pop-up device 4 lifts up the bulkhead upper 21 and the hood 11, a large gap G occurs between the hood 11 and an upper end of the hood grill 15. This gap G is used as an opening where the airbag 31 is deployed. For instance, the left and right bulkhead sides 22 of the bulkhead pop-up device 4 each include a driving unit 41 and a plunger 42 that is made to advance and retreat by the driving unit 41.

As long as the plunger 42 can be made to advance and retreat, any drive unit 41 is allowed. The driving unit 41 includes a gas generation unit for generating high-pressure gas upon receipt of a collision prediction signal that is based on the collision-predicting device 7 and comes from the judgment unit 94.

The plunger 42 is pushed up by the high-pressure gas of the gas generation unit and is made of a piston-like member used to lift the bulkhead upper 21 up.

<Hood-Moving Device>

As shown in FIG. 2, the hood-moving device 5 is a device configured to move forward or rearward the bulkhead upper 21 and the hood 11. For instance, the hood-moving device 5 includes an electric motor gear unit configured to rotationally move the pair of left and right bulkhead sides 22 forward or rearward, thereby moving forward or rearward the bulkhead upper 21 and the hood 11.

The hood-moving device 5 is placed on the bulkhead lower 23 and supports the pair of left and right bulkhead sides 22 standing vertically. The hood-moving device 5 moves, via the bulkhead sides 22, the bulkhead upper 21 and the hood 11 forward when the judgment unit 94 (see FIG. 3) predicts and determines that a pedestrian H collides with the vehicle C. In addition, the hood-moving device 5 moves, via the bulkhead sides 22, the bulkhead upper 21 and the hood 11 rearward after the airbag 31 is deployed. In this way, the hood-moving device 5 moves the hood 11 forward and then rearward and thus guides the pedestrian H to a suitable inclination direction when the pedestrian H has collided with the hood 11 and functions to improve the shock absorption at the time of collision. <Face Lower-Moving Device>

As shown in FIG. 2, the face lower-moving device 6 is a device configured to move forward or rearward the face lower 16. The face lower-moving device 6 is configured to, when the collision-predicting device 7 predicts a collision with a pedestrian H (see FIG. 5E), move and push the face lower 16 forward. Accordingly, the leg(s) of the pedestrian H is swept, and the pedestrian H is then inclined to the vehicle side, so that the pedestrian H hits the hood 11. For instance, the face lower-moving device 6 includes driving units 61 provided at left and right end portions of the face lower 16 and plungers 42 that are made to advance and retreat by the driving units 61.

<Controller>As shown in FIG. 3, the controller 9 includes a storage section 90, a processing section 91, a distance-determining unit 92, a pedestrian-identifying unit 93, and the judgment unit 94, and is, for instance, composed of a CPU, a ROM, and a RAM.

For instance, the storage section 90 stores image data captured by the camera 71 and pre-stores information needed for identification of the pedestrian H, etc. Examples of the information needed for identification of the pedestrian H include pedestrian templates characteristic of the contour of the pedestrian H. The storage section 90 is electrically connected to each of the distance-determining unit 92, the pedestrian-identifying unit 93, and the judgment unit 94.

In the processing section 91, image information acquired by the camera 71, information acquired by the millimeter-wave radar 72, and the vehicle C speed information acquired by the vehicle speed sensor 8 are compared to reference data stored in the storage section 90. The processing section 91 includes the distance-determining unit 92, the pedestrian-identifying unit 93, and the judgment unit 94.

The distance-determining unit 92 determines the distance (relative distance) between the vehicle C and the pedestrian H. The distance-determining unit 92 can analyze, for instance, parallax images captured by the camera 71 to determine the distance to the pedestrian H. Note that in the case of a single-lens camera, the distance between the vehicle C and the pedestrian H is measured using a laser radar or millimeter-wave radar.

The pedestrian-identifying unit 93 functions to identify the pedestrian H among objects included in images captured by the camera 71. For instance, the pedestrian-identifying unit 93 identifies, as the pedestrian H, an object having a contour looking like a pedestrian template by referring to pedestrian templates.

For instance, based on information from the camera 71, the millimeter-wave radar 72, the vehicle speed sensor 8, and the distance-determining unit 92, the judgment unit 94 calculates TCC (Time To Collision) and judges whether or not the vehicle C collides with the pedestrian H. When determining that the vehicle C collides with the pedestrian H, the judgment unit 94 actuates the airbag apparatus 3, the bulkhead pop-up device 4, the hood-moving device 5, and the face lower-moving device 6. Meanwhile, the judgment unit 94, for instance, predicts that the pedestrian H is going to collide therewith when it is determined that the collision with the pedestrian H is unavoidable even if the speed is reduced by an automatic braking function. In addition, the judgment unit 94 determines that the pedestrian H has collided therewith when the distance-determining unit 92 determines that the distance to the pedestrian H is zero. This judgment unit 94 is electrically connected to each of the airbag apparatus 3, the bulkhead pop-up device 4, the hood-moving device 5, and the face lower-moving device 6.

<<How Vehicular Protection System Works>>

With reference to FIGS. 1 to 5H, especially FIG. 4, the following describes how the vehicular protection system 1 according to an embodiment of the present invention works.

As shown in FIGS. 2 and 5A, the bulkhead pop-up device 4 is normally in a state in which the plungers 42 joined to the bulkhead upper 21 are lowered. In addition, the hood-moving device 5 is in a state in which the bulkhead sides 22 are supported standing vertically. This keeps the bulkhead 2 in a normal state as illustrated in FIG. 1. The hood 11 is at a lowered, retreated position and keeps the open space of the motor room R in a closed state.

As shown in FIG. 5A, the face lower-moving device 6 is in a state in which the plungers 62 joined to the face lower 16 has retreated.

When an ignition switch (not shown) is turned on, the camera 71, the millimeter-wave radar 72, and the vehicle speed sensor 8, as shown in FIG. 3, are enabled for monitoring. This permits the vehicular protection system 1 to monitor a collision between the vehicle C and the pedestrian H (protection target) and the vehicular protection system 1 then starts.

First, the camera 71 and the millimeter-wave radar 72 are used to obtain vehicle front image information and distance information (Step S1).

Next, the image information from the camera 71 is compared to pedestrian templates in the storage section 90, such as the height, volume, position of the gravity center, or shape of a pedestrian H, and the pedestrian-identifying unit 93 of the controller 9 determines whether or not the image is the pedestrian H (Step S2).

When the pedestrian-identifying unit 93 determines that the protection target image information from the camera 71 is the pedestrian H, the process goes to Step S3. When the pedestrian-identifying unit 93 determines that the image information from the camera 71 is not the pedestrian H, the process returns to Step S1 and the process from Step S1 to Step S2 is repeated.

Next, the vehicle speed sensor 8 is used to obtain a vehicle speed signal (Step S3). Specifically, the speed of the vehicle C is detected by measuring the rotation of a wheel.

Next, while the images captured by the camera 71 or the millimeter-wave radar 72 are analyzed, the distance-determining unit 92 determines the distance (relative distance) between the vehicle C and the pedestrian H (Step S4).

Next, the speed signal of Step S3, the signal about the distance from the vehicle C to the pedestrian H in Step S4, and data in the storage section 90 are compared and the judgment unit 94 then forecasts (predicts) and judges whether or not the pedestrian H collides with the vehicle C (Step S5).

When the judgment unit 94 determines that the pedestrian H is going to collide with the vehicle C, the process goes to Step S6. The judgment unit 94, as shown in FIG. 5B, transmits a trigger signal to and actuates the driving units 41 of the bulkhead pop-up device 4. The driving units 41 push the plungers 42 up, thereby lifting up the bulkhead upper 21, the linker 17a, and the hood 11. In this way, the bulkhead pop-up device 4 instantly lifts and pops up the hood 11 by a predetermined stroke.

Next, as shown in FIG. 5C, the judgment unit 94 (see FIG. 3) transmits a trigger signal to and actuates the hood-moving device 5 so as to rotate the bulkhead sides 22 forward and move the hood 11 forward (Step S7). At the same time, the judgment unit 94 (see FIG. 3) actuates the driving units 61 of the face lower-moving device 6 to push the plungers 62 and move forward the face lower 16 joined to the plungers 62 (Step S7).

Subsequently, the judgment unit 94 (see FIG. 3), as shown in FIG. 5D, actuates the inflator (not shown) of the airbag apparatus 3 to deploy the airbag 31 forward from a space between the hood 11 and the hood grill 15 (Step S8). Specifically, the inflator (not shown) generates high-pressure gas by quickly igniting a gas generating agent. This high-pressure gas is sent to the folded airbag 31 and the airbag 31 is made to be instantly deployed forwardly of the vehicle body.

In this way, the airbag 31, as shown in FIG. 5E, is deployed forwardly of the hood 11, the hood grill 15, and the bumper face 14 so as to receive the pedestrian H and is prepared for a collision with the pedestrian H.

Figure 5G:
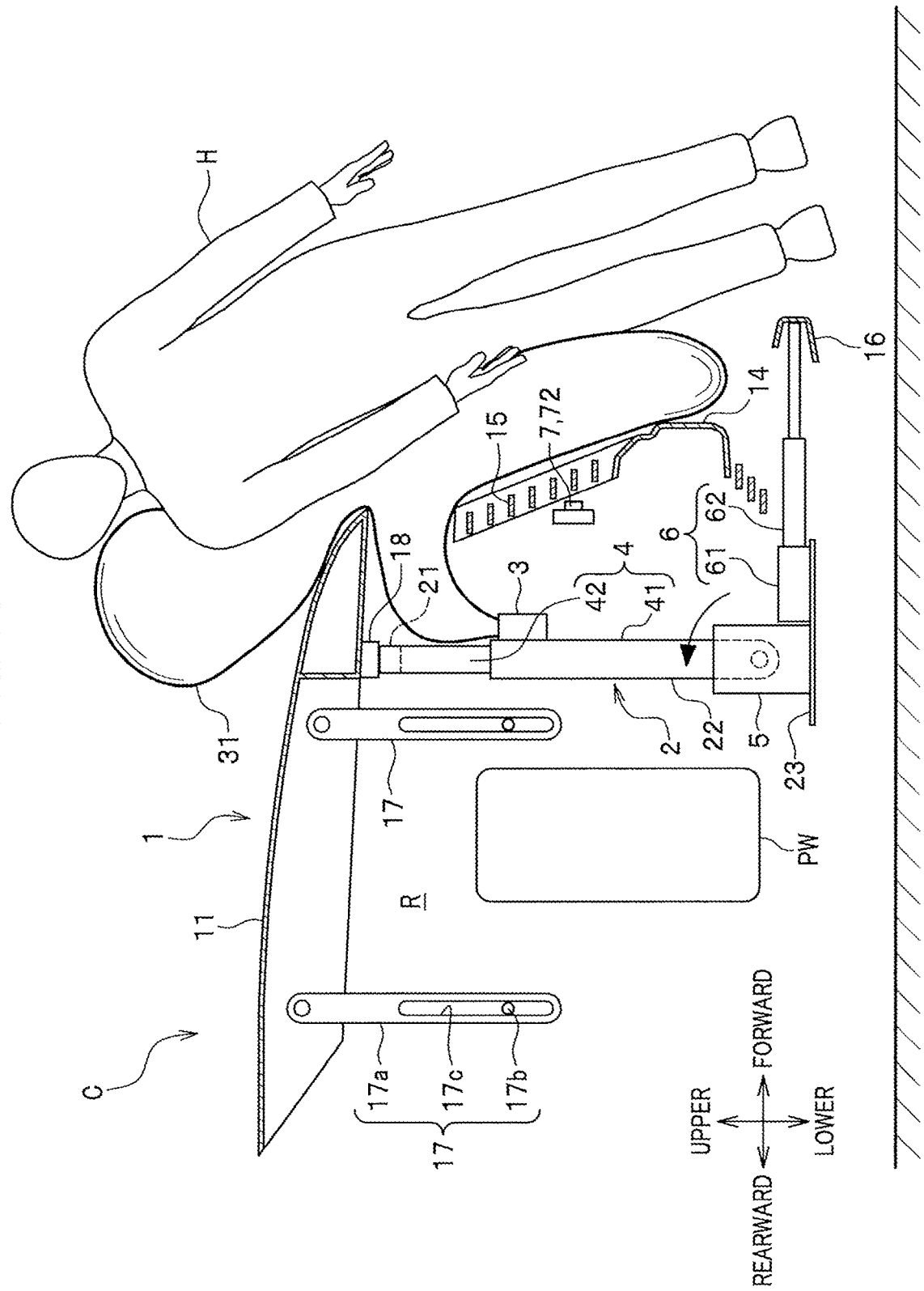
FIG. 5G is a diagram illustrating a state when the hood-moving device is used to move rearward the bulkhead upper and the hood.
Figure 5H:
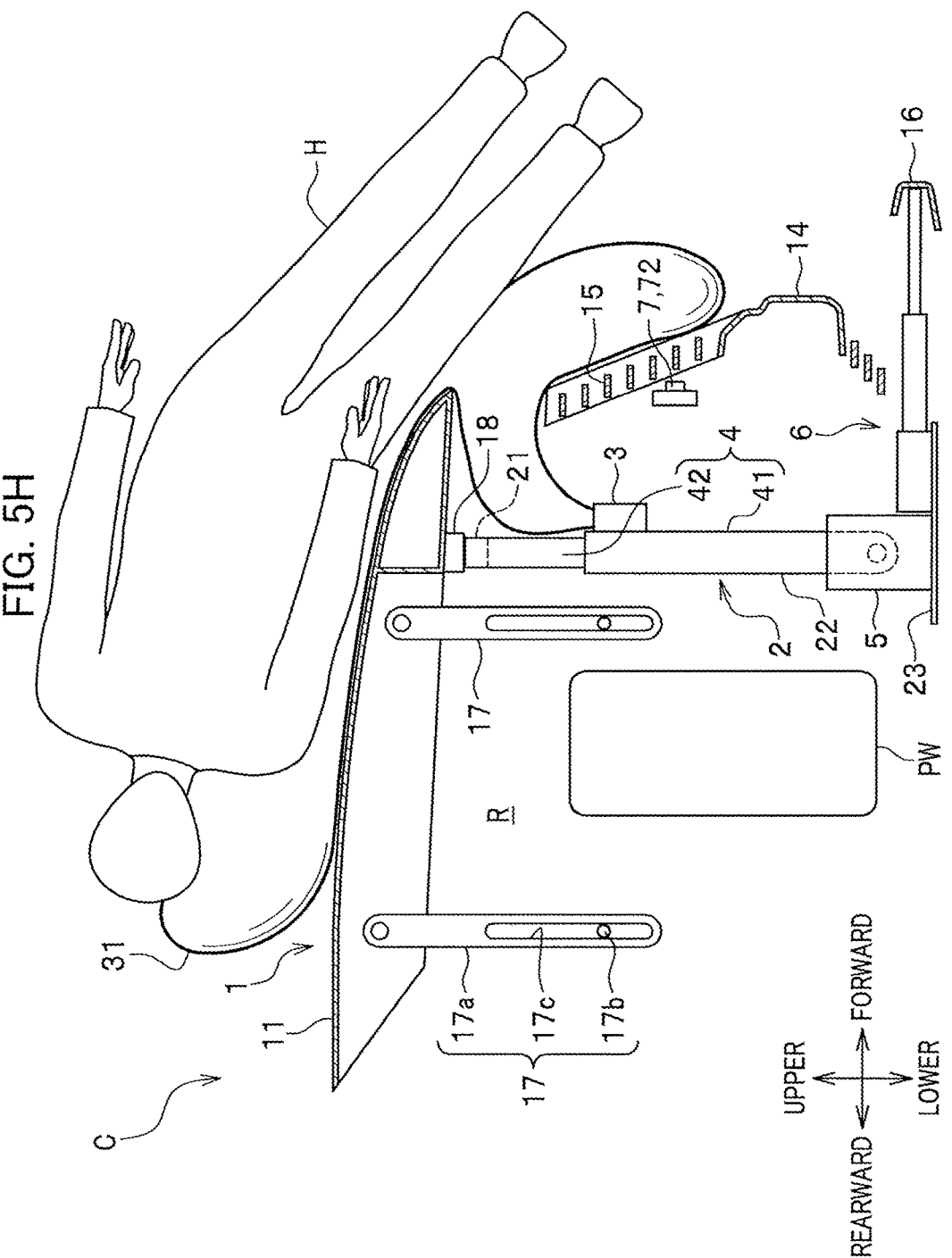
FIG. 5H is a diagram illustrating a state when the hood receives the protection target and an impact is absorbed.

When the pedestrian H has collided with the vehicle C, as shown in FIG. 5F, the airbag 31 elastically receives the pedestrian H and then absorbs the impact. In addition, the face lower 16, which has been pushed forward by the face lower-moving device 6, sweeps the leg(s) of the pedestrian H and he/she is then inclined to the vehicle side as shown in FIG. 5G. At that time, the hood 11 is lifted, by the bulkhead pop-up device 4, to the height of the waist of the pedestrian H. Accordingly, as shown in FIG. 5H, the pedestrian H can be smoothly guided and inclined onto the hood 11. In addition, as shown in FIG. 5G, the hood-moving device 5 rotates the bulkhead sides 22 rearward and thus moves the hood 11 and the bulkhead upper 21 rearward. Accordingly, the hood 11 is made to retreat to an area, where the head, etc., of the pedestrian H collides, while absorbing the impact.

In this way, as shown in FIG. 5H, the pedestrian H falls onto the hood 11 lifted and is elastically received by the whole hood 11. The hood 11 elastically receives the pedestrian H by using a flexible hood skin while retreating, so that the shock absorption can be improved.

As shown in FIGS. 5B to 5H, the bulkhead pop-up device 4 lifts up the bulkhead upper 21 and the hood 11. Then, the bulkhead upper 21 and the hood 11 are kept lifted. Consequently, this state can prevent the hood 11 from falling downward and then contacting the power unit PW (END).

The vehicular protection system 1 of the present invention is structured such that the bulkhead pop-up device 4 for lifting the hood 11, the hood-moving device 5 for moving the hood 11 forward or rearward, and the face lower-moving device 6 for sweeping the leg(s) of a pedestrian H (see FIG. 5H) are used to enhance hood 11-mediated shock absorption of the pedestrian H; and the airbag 31 is deployed forward while the pedestrian H is guided and inclined onto the hood 11 at a given position. This configuration enables the airbag 31 to be made compact.

Here, the present invention is the vehicular protection system 1 for protecting a pedestrian H (protection target) colliding with the vehicle C, characterized by including: as shown in FIGS. 1 and 2, the bulkhead 2 having the bulkhead upper 21 that extends in the vehicle widthwise direction and is arranged at an upper portion thereof; the hood 11 arranged over the bulkhead upper 21; the bulkhead pop-up device 4 configured to lift up the bulkhead upper 21 and the hood 11; and the hood-moving device 5 configured to be able to move forward the bulkhead upper 21 and the hood 11, wherein when the pedestrian H colliding with the vehicle C is protected, the bulkhead pop-up device 4 is used to lift up the bulkhead upper 21 and the hood 11 and the hood-moving device 5 is then used to move forward the bulkhead upper 21 and the hood 11.

This configuration permits the vehicular protection system 1 to use, when the pedestrian H (see FIG. 5F) has collided with the vehicle C, the bulkhead pop-up device 4 to lift up the bulkhead upper 21 and the hood 11 and use the hood-moving device 5 to move forward the bulkhead upper 21 and the hood 11, thereby capable of receiving the pedestrian H on the hood 11. This makes it possible to efficiently absorb the impact imposed on the pedestrian H. In addition, because the hood 11 receives the pedestrian H while moved upward and then forward, the hood 11 can be prevented from contacting the power unit PW arranged below the hood 11.

In addition, it is preferable that after the bulkhead pop-up device 4 is used to lift up the bulkhead upper 21 and the hood 11, the bulkhead upper 21 and the hood 11 stay lifted.

Accordingly, the bulkhead upper 21 and the hood 11 stay lifted by the bulkhead pop-up device 4, so that the contact between the hood 11 and the power unit PW can be further reliably prevented.

In addition, it is preferable to include the airbag apparatus 3 configured to protect the protection target colliding with the vehicle C such that after the hood-moving device 5 is used to move forward the bulkhead upper 21 and the hood 11, the airbag apparatus 3 makes the airbag 31 deployed forward from the lower side of the front end portion of the hood 11.

This makes it possible for the airbag 31 to be deployed forward from between the hood 11 and the bulkhead upper 21 that have been lifted by the bulkhead pop-up device 4 and then moved forward by the hood-moving device 5, so that the airbag 31 can be made compact.

In addition, it is preferable that the hood-moving device 5 is configured to be able to rotate, forward or rearward, the pair of left and right bulkhead sides 22 extending downward from the left and right ends of the bulkhead upper 21 and after the airbag 31 is deployed, the bulkhead upper 21 and the hood 11 are made to retreat.

Accordingly, after the airbag 31 is deployed, the hood 11 is made to retreat, so that the impact imposed on the received pedestrian H can be absorbed.

In addition, it is preferable that the front section of the vehicle C includes: the face lower 16 extending in the vehicle widthwise direction; the face lower-moving device 6 configured to be able to move forward the face lower 16; and the collision-predicting device 7 configured to predict a collision between a pedestrian H (protection target) and the vehicle C, and that when the collision-predicting device 7 predicts a collision with the pedestrian H, the face lower-moving device 6 is used to move the face lower 16 forward.

Accordingly, when it is predicted that the pedestrian H is going to collide with the vehicle C, the face lower-moving device 6 can be used to move the face lower 16 forward and sweep the leg(s) of the pedestrian H. The face lower 16 is made to be pushed and moved forward, thereby applying pressure to the leg(s), the position of which is lower than the center of gravity of the pedestrian H. This facilitates the leg(s) to be swept such that the pedestrian H falls and is inclined on the hood 11 at the front section of the vehicle body, thereby capable of absorbing the impact imposed on the pedestrian H.

[Modification Embodiments]

Note that the present invention is not limited to the above embodiments. Various alternations and modifications are allowed within the scope of the technical ideas. It is needless to say that the present invention is applicable to these altered and modified inventions.

For instance, any driving unit 41 of the bulkhead pop-up device 4 may be allowed as long as the driving unit can at least lift up the plunger 42. The structure thereof is not particularly limited. Examples of the driving unit 41 that can move up and down the plunger 42 include: an electric motor gear unit using an electric motor; a unit using spring force of a spring; a unit configured to use air compressed by a compressor so as to thrust the plunger 42; and a piston cylinder unit.

In addition, the bulkhead pop-up device 4 may be configured to stepwise or variably actuate the bulkhead upper 21 and the hood 11.

This makes it possible to stepwise or variably lift the bulkhead upper 21 and the hood 11 so as to be able to receive the pedestrian H.

In addition, the bulkhead pop-up device 4 may be configured to lift up the bulkhead upper 21 and the hood 11 and, after the airbag 31 is deployed, make the bulkhead upper 21 and the hood 11 stay lifted for a given period and make them elastically move downward as the airbag 31 shrinks.

Accordingly, after the airbag 31 is deployed, the bulkhead pop-up device 4 is used to make the bulkhead upper 21 and the hood 11 stay lifted for a given period and they are then elastically moved downward as the airbag 31 shrinks. This makes it possible to absorb the impact imposed on the pedestrian H received on the hood 11.

In addition, examples of the driving unit 61 of the face lower-moving device 6, like the above-described bulkhead pop-up device 4, include: an electric motor gear unit using an electric motor; a unit using spring force of a spring; a unit configured to use air compressed by a compressor so as to thrust the plunger 62; and a piston cylinder unit.

In addition, exemplified is the embodiment where the hood-moving device 5 is used to rotate, forward or rearward, the left and right bulkhead sides 22 so as to move the hood 11 forward or rearward. The structure thereof is not particularly limited. Examples of the hood-moving device 5 include: a device having the driving unit main body 51 on an inner wall around the open space of the motor room R and configured to move forward or rearward the hood 11 by using an electric motor gear unit; a device configured to move forward or rearward the hood 11 by using a plunger actuated by compressed air; a device configured to move forward or rearward the hood 11 by using a piston cylinder unit; and an electromagnetic unit using electromagnetic force.

In addition, the vehicular protection system 1 may work on any protection targets such as animals and non-animal objects or may work on only humans as well as may work after a two-wheel vehicle such as a bicycle is identified from images acquired by the camera 71.

In addition, the face lower 16 may be installed on the entire lower side of the bumper face 14 so as to cover the entire lower portion of the front section of the vehicle body.

REFERENCE SIGNS LIST

1 Vehicular protection system
2 Bulkhead
3 Airbag apparatus
4 Bulkhead pop-up device
5 Hood-moving device
6 Face lower-moving device
7 Collision-predicting device
11 Hood
16 Face lower
21 Bulkhead upper
22 Bulkhead side
31 Airbag
C Vehicle
H Pedestrian (Protection target)

The invention claimed is:

1. A vehicular protection system for protecting a protection target colliding with a vehicle, comprising:
   a bulkhead having a bulkhead upper which extends in a vehicle widthwise direction and is arranged at an upper portion thereof;
   a hood arranged over the bulkhead upper;
   a bulkhead pop-up device configured to lift up the bulkhead upper and the hood; and
   a hood-moving device configured to be able to move forward the bulkhead upper and the hood, wherein
   when the protection target colliding with the vehicle is protected, the bulkhead pop-up device is used to lift up the bulkhead upper and the hood and the hood-moving device is then used to move forward the bulkhead upper and the hood.

2. The vehicular protection system according to claim 1, further comprising an airbag apparatus configured to protect the protection target colliding with the vehicle, wherein
   after the hood-moving device is used to move forward the bulkhead upper and the hood, the airbag apparatus makes an airbag deployed forward from a lower side of a front end portion of the hood.

3. The vehicular protection system according to claim 2, wherein the hood-moving device is configured to be able to rotate, forward or rearward, a pair of left and right bulkhead sides extending downward from left and right ends of the bulkhead upper; and after the airbag is deployed, the bulkhead upper and the hood are made to retreat.

4. The vehicular protection system according to claim 1, wherein the bulkhead pop-up device is configured to stepwise or variably actuate the bulkhead upper and the hood.

5. The vehicular protection system according to claim 1, wherein the bulkhead pop-up device is configured to lift up the bulkhead upper and the hood and then to make the bulkhead upper and the hood stay lifted.

6. The vehicular protection system according to claim 1, wherein a front section of the vehicle comprises:
   a face lower extending in the vehicle widthwise direction;
   a face lower-moving device configured to be able to move forward the face lower; and
   a collision-predicting device configured to predict a collision between the protection target and the vehicle, and wherein
   when the collision-predicting device predicts a collision with the protection target, the face lower-moving device is used to move the face lower forward.

* * * * *